United States Patent [19]

Zelenák née Zoltai et al.

[11] Patent Number: 5,006,352

[45] Date of Patent: Apr. 9, 1991

[54] PROCESS FOR THE PRODUCTION OF AN OXYGENATED RESTORATIVE DRINK

[75] Inventors: Mária Zelenák née Zoltai; Lá/zló Berzsenyi, both of Budapest, Hungary

[73] Assignee: Mester-Coop Élelmiszeripari és Ker. Leányvállalat, Budapest, Hungary

[21] Appl. No.: 276,052

[22] PCT Filed: Feb. 26, 1988

[86] PCT No.: PCT/HU88/00008

§ 371 Date: Dec. 23, 1988

§ 102(e) Date: Dec. 23, 1988

[87] PCT Pub. No.: WO88/06411

PCT Pub. Date: Sep. 7, 1988

[30] Foreign Application Priority Data

Feb. 27, 1987 [HU] Hungary ................. 803/87

[51] Int. Cl.$^5$ ............................................. A23L 2/26
[52] U.S. Cl. ..................................... 426/67; 426/324; 426/330; 426/477; 426/590
[58] Field of Search ............ 426/66, 67, 477, 474, 426/395, 397, 118, 119, 591, 590, 324, 330, 569

[56] References Cited

U.S. PATENT DOCUMENTS

| | | | |
|---|---|---|---|
| 348,344 | 8/1866 | Riggs | 426/477 |
| 1,725,956 | 8/1929 | Cleveland | 426/590 |
| 2,071,990 | 12/1934 | Tiger | 426/590 |
| 2,927,028 | 3/1960 | Miller | 426/477 |
| 3,039,644 | 6/1962 | Lefcort | 426/119 |
| 3,728,129 | 4/1973 | Sargent | 426/474 |
| 3,743,520 | 7/1973 | Croner | 426/119 |
| 4,027,045 | 5/1977 | Fedotkin | 426/474 |
| 4,495,116 | 1/1985 | Kakeno et al. | |

FOREIGN PATENT DOCUMENTS

| | | | |
|---|---|---|---|
| 1261 | 3/1936 | Australia | 426/474 |
| 56-140071 | 1/1981 | Japan . | |
| 62-29954 | 2/1987 | Japan | 426/590 |
| 785355 | 12/1980 | U.S.S.R. | 426/474 |
| 1072536 | 6/1967 | United Kingdom . | |

OTHER PUBLICATIONS

Novaya Keramika, p. 68, lines 15–25 (1969) Budnikov et al.

*Primary Examiner*—Carolyn Paden
*Attorney, Agent, or Firm*—Schweitzer Cornman & Gross

[57] ABSTRACT

This invention relates to a process for the preparation and commercialization of protective drinks saturated with molecular oxygen. The process of the invention comprises subjecting the mineral water or conduit water used for producing the protective drinks to the usual purification process, optionally mixing them with the aromatizing stock solutions, cooling the optionally aromated protective drinks between 0° C. and 5° C. and saturating them with molecular oxygen gas at the same temperature in a saturating equipment at a pressure of preferably 0.3 to 0.4 MPa, then bottling under pressure. In the production flavoring agents, preferably sugar, fructose, native flavors, e.g. apple, lemon, orange, plant extracts etc. may be used.

6 Claims, No Drawings

PROCESS FOR THE PRODUCTION OF AN OXYGENATED RESTORATIVE DRINK

FIELD OF THE INVENTION

The invention relates to a process for the industrial production of restorative drinks saturated with molecular oxygen, by increasing the oxygen content of the drink by saturation.

BACKGROUND OF THE INVENTION

Physical tiredness is mainly the consequence of the anoxia (hypoxia) in the blood, i.e. the oxygen insufficiently of the haemoglobin, since the muscle work is fed by the oxygen content of the blood.

Saturation of the blood with oxygen takes place through respiration. In the case of a strong physical exercise, the saturation of the blood with oxygen by respiration may be insufficient because of the limited capacity of the lungs or the low oxygen content of the air.

It is known also to supply oxygen through the stomach which is more effective than respiration of air. The principles of this so-called enteral oxygen supply are based on other physiological effects in addition to the oxygen supply of the muscle cells. (M. E. Marsak: The Regulation of Human Respiration (in Russian), Moscow, 1971; N. V. Sirotin; Enteral Oxygen Therapy (in Russian), Kiev, 1968).

There are also known Soviet experiments [I. Karpenko et al.: The Restoration of the Working Capacity of Sportsmen After a Strong Physical Exercise (in Russian), Moscow, 1974] relating to a foam-cocktail saturated with oxygen as well as to the positive results of the consumption thereof by sportsmen and sportswomen.

Rose hip syrup with eggwhite to provide a large surface, were added to the preparation of the Soviet foam-cocktail to ensure most completely the saturation with oxygen. The disadvantage of this process is in that the quality of the eggwhite froth is deteriorated by contacting with a liquid phase. The short shelf life is another drawback.

DESCRIPTION OF THE INVENTION

The aim of the present invention is to saturate fruit-based drinks or plain water by the combined use of simple physical processes.

In the process of the invention, the oxygenating gas is cooled to a temperature between 2° C. and 3° C.; the liquid is saturated with the oxygen under a pressure of 0.3 to 0.4 mPa in saturating equipment; filled into pressure bottles of 0.25, 0.33 or 0.5 liter volume fitted with a crown stopper; and then commercialized.

In addition to the traditional commercialization in bottles and collecting boxes, a novel type of product is provided in that any desired flavoring can be carried out by consumer, by using a flavoring package. In the package, there is a fruit or flavoring syrup with the appropriate formulation which can be added to the bottled restorative drink previously saturated with oxygen.

The advantages of this new form of consumer-provided flavoring is that the shelf life of restorative drinks can be increased since the natural oxidation of natural fruit juices under the effect of oxygen does not have to be taken into account during the shelf life of the oxygenated water.

When produced with the direct use of fruit syrups in the manufacturing, the shelf life of drinks is about 6 months, however, this duration can be extended to about 12 months for restorative drinks without any flavoring.

The restorative drinks thus prepared contain:

| | |
|---|---|
| dissolved oxygen | 32 to 35 mg/liters |
| dry substance | 9 to 1 refr. % |
| acid (express as citric acid) | 0.35 to 0.4% |
| potassium sorbate | 0.1% |

For the production of the drinks by the process according to the invention, flavored or natural mineral water as well as plain water can be used. The restorative drinks can be also subsequently flavored by the consumer.

The starting mineral water or plain water can be subjected to conventional physical purification then, the following steps can be carried out, depending on whether any flavoring is carried out during the production, or subsequently by the consumer.

1. Saturation of unflavored mineral water with molecular oxygen:
  1.1 purification of the mineral water by filtration;
  1.2 cooling of the purified mineral water to between 2° to 3° C.;
  1.3 saturation of the cooled mineral water with oxygen under a pressure of 0.3 to 0.4 megapascals (MPa) in saturating equipment;
  1.4 bottling in white or green pressure bottles of 0.25, 0.33, or 0.5 liter volume and adapted to be fitted with crown stoppers;
  1.5 closing by a crown-stopper machine;
  1.6 labelling; and
  1.7 readying for sale in collecting boxes or special packaging.
2. Saturation of flavoring mineral or plain water with oxygen:
  2.1 arrangement of the plain or mineral water,
  2.2. preparation of flavoring stock solutions;
  2.3 mixing the stock solution with the mineral or plain water;
  2.4 cooling of the flavored drink to between 3° to 4° C.;
  2.5 saturation of the flavored drink with oxygen under a pressure of 0.3 to 0.5 MPa in saturating equipment;
  2.6 bottling in green pressure bottles of 0.25, 0.33 or 0.5 liter volume adapted to be fitted with crown stoppers;
  2.7 closing by a crown-stopper machine; and
  2.8 packaging for commercialization.

| Composition of the various flavoring stock solutions used for flavoring 100 liters of a finished restorative drink | |
|---|---|
| 2.1.1 | |
| Sugar solution (prepared by using crystalline saccharose or fructose) with dry substance content of 65 refr. % | 14 kg |
| Crystalline citric acid | 0.35–0.4 kg |
| Crystalline potassium sorbate | 0.1 kg |
| Lemon flavor (identical to the natural one) | 0.05 kg |
| Optional natural plant extract concentrate (e.g. tea, chamomile flower, lime blossom, ginger, etc.) | up to 0.1 kg |
| 2.1.2 | |

-continued

Composition of the various flavoring stock solutions used for flavoring 100 liters of a finished restorative drink

| | |
|---|---|
| Apple syrup with a dry substance content of 68 refr. % | 12 kg |
| Citric acid | 0.12 kg |
| Potassium sorbate | 0.10 kg |
| Sodium chloride | 0.05 kg |
| 2.1.3 | |
| Lemon (or orange) syrup with a dry substance content of 68 refr. % | 12 kg |
| Citric acid | 0.06 kg |
| Potassium acid | 0.1 kg |
| Sodium chloride | 0.05 kg |
| 2.1.4 | |
| Artichoke syrup with a dry substance content of 68 refr. % | 12 kg |
| Citric acid | 0.10 kg |
| Potassium sorbate | 0.10 kg |
| Sodium chloride | 0.05 kg |

Absorption of the gaseous oxygen used in the process of the invention involving the handling, storage and transport of the gas cylinder, can be carried out, for example, according to MSZ (Hungarian Standard) No. 6292-52, for assuring safe working conditions.

The production line is analogous to that used in making carbonated beverages, except that an oxygen gas cylinder is employed instead of the carbon dioxide gas cylinder. The oxygen gas is introduced into the saturating equipment through a suitable pressure regulator. Oil should not be permitted to penetrate into the system since that may create a danger of explosion.

When mineral water is used the synergistic effect of the trace elements thereof is an added result. Such trace elements are know to intensify the working capacity of the human body by increasing the activity of enzymes in the blood plasma.

The refreshing effect and restoring capacity of the drink prepared according to the invention on the organism was observed in clinical tests. The effect of consumption of the drink enriched in oxygen was subjected to long-lasting, widely extended examinations in the National Institute for Physical Education and Sports Hygiene of Hungary and in sports training camps. The results have been reported by Pucsok et al. [Report on the Performance-Increasing Effect of the "Apenta" Base Drink Enriched in Oxygen and Other Related Physiological Investigations (1985)]. The effect of increased physical capacity was measured by effect on the running speed and by the duration of the total performance. The physiological changes were characterized by the partial pressure of the oxygen content of the arterialized capillary blood; saturation with oxygen calculated for the given pH value; and other parameters characteristic of the acid-base household (partial pressure of carbon dioxide, actual and standard bicarbonate content, decrease in the base content, as well as alteration of the blood lactate level).

All tests were carried out in a randomized arrangement by using the 'Apenta' mineral water as control. Laboratory ergometric exercises, precisely measured performances in training grounds and in competitions, and also subjective information obtained from the competitors, have equally been taken into consideration.

The effect of the consumption of oxygenated restorative drink by the sportsmen and sportswomen was investigated in taekwondo, basketball, volleyball, soccer, boxing, fencing, athletics (racers, throwers), tennis, figure skating and speed skating. Nearly 200 sportsmen and sportswomen participated in these trials.

It was concluded from the report that it is definitely desirable to consume the restorative drink prepared according to the invention both in further experiments and in preparations for competitions. Based on both subjective and objective experiences, the restorative drink can be used also in fields where persons performing physical work would benefit from consuming a restorative drink.

The use of the oxygenated restorative drink serves mainly to restore the organism rapidly after long-lasting and exhausting physical work thus, its use is particularly indicated for sportsmen and women when the rapid restoration or regeneration is important. The Professional Board of the Hungarian National Institute for Physical Education and Sports Hygiene considered the oxygenated restorative drink and accepted it for the alimentation and fluid consumption of sportsmen and women. Research is continuing for the determination of the oxygen absorbing capacity an for clearing up the action mechanism of treatment and the activity of enzymes participating in the binding of oxygen.

The process according to the invention is illustrated in detail by the following illustrative examples.

EXAMPLE 1

Composition of 100 liters of restorative drink

| | |
|---|---|
| Sugar (or fructose) | 8.0 kg (7.0 kg) |
| Citric acid | 0.35 kg |
| Lemon flavor identical to the natural one | 0.010 kg |
| Potassium sorbate | 0.100 kg |
| Sodium chloride | 0.050 kg |
| Water | 91.490 kg |
| dissolved oxygen | 0.0036 kg |

EXAMPLE 2

Composition of 100 liters of restorative drink

| | |
|---|---|
| Sugar (or fructose) | 8.0 kg (7.0 kg) |
| Citric acid | 0.35 kg |
| Lemon flavor identical to the natural one | 0.010 kg |
| Potassium sorbate | 0.100 kg |
| Mineral water from Hungary ("Kekkuti", "Fonyodi", "Mohai Agnes" etc.) | 91.490 kg |
| Dissolved oxygen | 0.0036 kg |

EXAMPLE 3

| | |
|---|---|
| Apple concentrate of 68 refr. % | 12 kg |
| Citric acid | 0.12 kg |
| Lemon flavor identical to the natural one | 0.10 kg |
| Potassium sorbate | 0.05 kg |
| Water | 87.73 kg |
| Dissolved oxygen | 0.0036 kg |

EXAMPLE 4

| | |
|---|---|
| Mineral Water ("Mohai Agnes", "Kekkuti", "Fonyodi", etc.) | 100 liters |
| Dissolved oxygen | 0.0036 kg |

EXAMPLE 5

| Lemon or orange concentrate of 68 refr. % | 12 kg |
|---|---|

EXAMPLE 6

| Artichoke syrup of 68 refr. % | 12 kg |
|---|---|
| Citric acid | 0.10 kg |
| Lemon flavor identical to the natural one | 0.10 kg |
| Potassium sorbate | 0.05 kg |
| Water | 87.75 kg |
| Dissolved oxygen | 0.0036 kg |

EXAMPLE 7

| Sugar of fructose | 8 kg |
|---|---|
| Citric acid | 0.35 kg |
| Lemon flavor identical to the natural one | 0.10 kg |
| Potassium sorbate | 0.05 kg |
| Plant concentration | 0.10 kg |
| Water | 91.45 kg |

| -continued | |
|---|---|
| Dissolved oxygen | 0.0036 kg |

We claim:

1. A process for producing a restorative drink having a good shelf life and which does not need to be stored under refrigeration, which consists essentially of saturating under pressure plain water, or mineral water having a temperature of from about 0° C. to about 5° C., with molecular oxygen, filling said water into a bottle, and then sealing said bottle under pressure to obtain an oxygenated restorative drink.

2. The process of claim 1, further comprising adding flavoring to the water prior to said filling.

3. The process of claim 1, further comprising adding flavoring to the water after said filling.

4. The process of claim 3, wherein said flavoring comprises on or more of sugar, fructose, natural flavoring agent, fruit syrup, fruit acid, and natural plant extract.

5. The process of claim 1, wherein said pressure is from about 0.3 to about 0.4 MPa.

6. The process of claim 1, further comprising packaging a bottle of said restorative drink, together with a package containing a flavor for flavoring the water.

* * * * *